April 28, 1964     A. VIAPLANA GURI     3,131,332
ELECTRONICALLY OPERATED PHOTOSENSITIVE PICK-UP SYSTEM
Filed Nov. 3, 1959
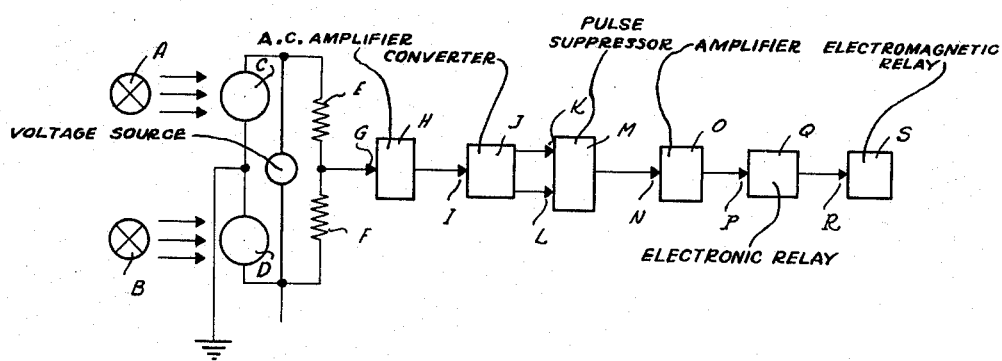
INVENTOR.
Antonio Viaplana Guri
BY
Michael S. Striker
Attorney

United States Patent Office 3,131,332
Patented Apr. 28, 1964

3,131,332
ELECTRONICALLY OPERATED PHOTOSENSITIVE PICK-UP SYSTEM
Antonio Viaplana Guri, Avenida Virgen de Montserrat 15, Barcelona, Spain
Filed Nov. 3, 1959, Ser. No. 850,599
Claims priority, application Spain Nov. 8, 1958
5 Claims. (Cl. 317—130)

The present invention relates to an electronic system provided with a group of photoelectric cells so mounted that the same may be energized, and therefore they are adapted to generate the desired electric current even when the incident light is weak or when the ambient light is rather high or variable, as it does occur in plants or workshops, and, generally speaking in all such cases in which a low contrast factor is present. Owing to the sensitiveness of the photoelectric group it is possible to detect the presence of movable bodies of small cross section, such as threads running through textile machines provided that the same totally or partially intersect the light beam with which the cells are operated. With the above operating conditions, the system constituting the subject matter of the present invention is particularly useful in the control for technical or labour purposes (textile and chemical industries, several measurements, labour protection, damage indicator and the like).

The system in question essentially, contemplates the installation of two photoelectric cells adapted to be energized by means of respective light sources, the cells being mounted in differential or bridge network, the balance voltage of which is applied to the input side of an electronic amplifier, followed of a voltage dephaser and a rectifier for the two half waves which, in turn, has connected thereto a relay of electronic type and adapted to operate a magnetic relay suitable to provide a given mechanical, acoustic or luminous effect which may be used for control or signaling purposes.

In order that the present invention may be readily carried into effect, it will now be described with reference to the accompanying drawing, the single figure of which is a schematic diagram, partly circuit and partly block, of an embodiment of the photosensitive system of the present invention.

The subject matter of the invention comprises the installation of two light sources A and B projecting respective light beams onto as many photoelectric cells C and D mounted, in the present instance, in a bridge circuit constituted by the two resistors E and F, the said circuit being connected, on the one hand to the ground, and on the other hand, at the point G to the impulse or alternating voltage amplifier H. The latter is followed, through a connection at the point I, the dephaser network J adapted to provide a negative and a positive pulse for each input pulse, regardless of the polarity of the latter.

The above device is connected through the points K and L to the complete wave, electric rectifier M which, through N is connected to a voltage amplifier O. The amplifier O is followed, through P by an electronic relay Q connected through R with a final electromagnetic relay S intended to operate contacts by means of which a circuit having mechanical, acoustic or luminous means, will be operated for the specific purpose of controlling or signaling.

The sources A and B may be of a very varied nature, in the proviso that they provide a luminous beam of the physical specifications required for the energization of the photoelectric cells C and D. Photoelectric cells of photo-emitter, electrolytic or photochemical, imperfect contact, photoresistor, phototransistor and the like nature may be used in this circuit. The assembling of the said photocells C and D may be carried into practice in differential or bridge circuit, the latter example being illustrated in the diagram. The amplifier H may be based on electronic tubes or transistors, while the electronic relay may consist of a gas-filled valve or any equivalent device, such as a flip-flop circuit, a relay transistor or the like. Finally, the electromagnetic relay S is made to operate with contacts acting as two-way or one-way switches for the purpose of driving indicator means or mechanical elements as mentioned above.

The working of the described system is, in rough lines, as follows:

Assuming that all of the signal voltages are referred to the common ground point, when the luminous intensity or any of the photocells C and D is abruptly changed, as for example totally or partially cut off of the respective light beam, a voltage pulse will be obtained between the point G and the ground, which pulse, after being suitably amplified by means of the amplifier H, will be fed to the input of the dephaser J, that is, at the point I.

Two pulses of contrary polarity as regards the ground will appear at the output of the dephaser, at the points K and L, which will be rectified by the rectifier M, a single pulse being thus obtained between the point N and the ground.

It should be noted that any pulse being fed to the point G will be converted into a pulse at N, always with the same polarity, regardless of the polarity of the pulse appearing at the point G. The pulse obtained at point N is applied to the point P or input of the electronic relay Q either directly or through the amplifier O. Relay Q operates by means of the device R the final relay S directly driving the final circuit.

It will appear from the above that equal light variations in both photoelectric cells C and D taking place at the same instant will not unbalance the bridge circuit and the final relay is accordingly not operated in such a case.

It is obvious, of course, that some variations such as shape and size, as well as suitable materials can be utilized in the present invention without departing from the scope thereof as defined in the appended claims.

I claim:

1. A photosensitive system comprising, in combination, a pair of photosensitive elements; a balanced electric circuit having an output terminal and including said photosensitive elements and adapted to produce an output voltage at said output terminal upon the occurrence of a difference in the intensity of light impinging upon either of the said photosensitive elements in relation to the other; indicating means responsive to a pulse of predetermined polarity for indicating the presence of said output voltage; and control means connected between said circuit and said indicating means for converting said output voltage to a pulse of said predetermined polarity so that a difference in intensity of light impinging upon either of said photosensitive elements in relation to the other is indicated by the said indicating means.

2. A photosensitive system comprising, in combination, a pair of photosensitive elements; a balanced electric circuit having an output terminal and including said photosensitive elements and adapted to produce an output voltage at said output terminal upon the occurrence of a difference in the intensity of light impinging upon either of the said photosensitive elements in relation to the other, said photosensitive elements being mounted in a manner such that said output voltage is zero when the intensity of light impinging upon either of the said photosensitive elements is equal to that impinging upon the other; indicating means responsive to a pulse of predetermined polarity for indicating the presence of said output voltage; and control means connected between said circuit and said indicating means for converting said output voltage to a pulse of said predetermined polarity so that a difference in intensity of light impinging upon either of said photosensitive elements in relation to the other is indicated by the said indicating means, said control means comprising converting means having an input and an output for converting said output voltage to positive and negative pulses, means for applying said output voltage to the input of said converting means, and suppressing means connected between the output of said converting means and said indicating means for passing pulses of said predetermined polarity and for suppressing pulses of the other polarity.

3. A photosensitive system comprising, in combination, a pair of photosensitive elements; a balanced electric circuit having an output terminal and including said photosensitive elements and adapted to produce an output voltage at said output terminal upon the occurrence of a difference in the intensity of light impinging upon either of the said photosensitive elements in relation to the other, said photosensitve elements being mounted in a manner such that said output voltage is zero when the intensity of light impinging upon either of the said photosensitive elements is equal to that impinging upon the other; indicating means responsive to a pulse of predetermined polarity for indicating the presence of said output voltage; and control means connected between said circuit and said indicating means for converting said output voltage to a pulse of said predetermined polarity so that a difference in intensity of light impinging upon either of said photosensitive elements in relation to the other is indicated by the said indicating means, said control means comprising alternating current amplifying means, converting means having an input and an output for converting said output voltage to positive and negative pulses, means for applying said output voltage to the input of said converting means through said alternating current amplifying means, suppressing means having an input connected to the output of said converting means and an output for passing pulses of said predetermined polarity and for suppressing pulses of the other polarity, and relay means responsive to pulses of said predetermined polarity connected between the output of said suppressing means and said indicating means.

4. A photosensitive system compirsing, in combination, a pair of photosensitive elements; a balanced electric circuit having an output terminal and including said photosensitive elements and adapted to produce an output voltage at said output terminal upon the occurrence of a difference in the intensity of light impinging upon either of the said photosensitive elements in relation to the other, said photo-sensitive elements being mounted in a manner such that said output voltage is zero when the intensity of light impinging upon either of the said photosensitive elements is equal to that impinging upon the other; indicating means responsive to a pulse of predetermined polarity for indicating the presence of said output voltage; and control means connected between said circuit and said indicating means for converting said output voltage to a pulse of said predetermined polarity so that a difference in intensity of light impinging upon either of said photosensitive elements in relation to the other is indicated by the said indicating means, said control means comprising alternating current amplifying means, converting means having an input and an output for converting said output voltage to positive and negative pulses, means for applying said output voltage to the input of said converting means through said alternating current amplifying means, suppressing means having an input connected to the output of said converting means and an output for passing pulses of said predetermined polarity and for suppressing pulses of the other polarity, electronic relay means responsive to pulses of said predetermined polarity connected to the output of said suppressing means, said electronic relay means being adapted to produce a control voltage, and electromagnetic relay means responsive to said control voltage, and connected between said electronic relay means and said indicating means.

5. A photosensitive system comprising, in combination, a pair of photosensitive elements; a balanced electric circuit having an output terminal and including said photosensitive elements and adapted to produce an output voltage at said output terminal upon the occurrence of a difference indicating a rapid increase or decrease in the intensity of light impinging upon either of the said photosensitive elements in relation to the other, said photosensitive elements being mounted in a manner such that said output voltage is zero when the intensity of light impinging upon either of the said photosensitive elements is equal to that impinging upon the other; indicating means responsive to a pulse of predetermined polarity for indicating the presence of said output voltage; and control means connected between said circuit and said indicating means for converting said output voltage to a pulse of said predetermined polarity so that a difference in intensity of light impinging upon either of said photosensitive elements in relation to the other is indicated by the said indicating means, said control means comprising alternating current amplifying means, converting means having an input and an output for converting said output voltage to positive and negative pulses, means for applying said output voltage to the input of said converting means through said alternating current amplifying means, suppressing means having an input connected to the output of said converting means and an output for passing pulses of said predetermined polarity and for suppressing pulses of the other polarity electronic relay means responsive to pulses of said predetermined polarity connected to the output of said suppressing means, said electronic relay means being adapted to produce a control voltage, and electromagnetic relay means responsive to said control voltage and connected between said electronic relay means and said indicating means.

References Cited in the file of this patent

UNITED STATES PATENTS

| | | |
|---|---|---|
| 2,016,036 | Fitz Gerald | Oct. 1, 1935 |
| 2,065,758 | Shepard | Dec. 29, 1936 |
| 2,278,920 | Evans et al. | Apr. 7, 1942 |
| 2,517,554 | Frommer | Aug. 8, 1950 |
| 2,695,402 | Gray | Nov. 23, 1954 |
| 2,768,336 | Shoultes et al. | Oct. 23, 1956 |

OTHER REFERENCES

Batcher-Moulic: "The Electronic Control Handbook" copyright 1946 by Caldwell-Clements, Inc., pp. 30, 123, 196, 212, 213.